3,076,710
METHOD OF PREPARING A BAKING DOUGH AND BAKED PRODUCT THEREOF

Dirk Remment Koolhaas, Utrecht, Netherlands, assignor to N.V. Tervalon, Maatschappij voor voedingsmiddelen op wetenschappelijke basis, Utrecht, Netherlands
No Drawing. Filed July 5, 1956, Ser. No. 595,833
Claims priority, application Netherlands July 6, 1955
10 Claims. (Cl. 99—90)

The invention relates to a method of producing dry pastry containing an edible protein flour and fat. The dry pastry may, if required, have vitamins added to it or may contain sugars, such as glucose and/or saccharose, and flavourings.

The invention relates more particularly to the production of dry pastry having a comparatively high edible protein content.

The term "dry pastry" as used herein is to be understood to mean pastry which is prepared from flour, fat, edible proteins and, as the case may be, other baking materials, such as leavening agents and has a moisture content of not more than 8% and an edible protein content of at least 10%. The dry pastry in accordance with the invention may take the form of biscuits, crackers, or rusk, however other forms may be used also.

A method of producing pastry containing an added protein is known. However, this method relates to the production of bread, and for this pastry no exclusive rights are claimed in this application. According to the known method, use is made of a dough containing 50% by weight of casein, and in addition a kind of flour consisting of about 43.5% of gluten and of about 0.8% of fat.

In addition, is known to produce biscuits from a dough obtained by adding cheese to a dough containing flour of wheat, maize, peas, lentils and rice. Such a dough contains a comparatively high percentage of proteins, inter alia owing to the high protein content of cheese. This method has a limitation in that the proteins contained in cheese bind water to a comparatively high extent and, in the baking process, lose this water slowly. Thus, not only is the economy of the baking process adversely affected, but also, due to the comparatively long duration of the baking process a comparatively high extent of denaturation of the proteins contained in the dough occurs.

It is an object of the invention to produce dry pastry having a comparatively high edible protein content, while avoiding the need of increasing the amount of water required for making a dough from the flour due to the fact that the water combines with the additional dry edible protein. When water is absorbed by the added protein the consistency of the dough is adversely affected since its structure becomes loose and crumbly and the proportion of moisture of the dough becomes excessive because of the increase of the amount of water. Also, the baking process is adversely affected, since the evaporation of the additional amount of water requires a longer duration of the baking process. This may give rise to additional denaturation of the proteins. According to the invention, these disadvantages are avoided in that the dough has a edible dry protein added to it which has been made substantially inaccessible to water.

The invention relates to a method of producing dry pastry containing an edible protein, flour and fat. According to the invention there is added to a dough, consisting substantially of water, flour and a leavening agent, a dry edible protein, the individual particles of which are surrounded with a layer which is substantially impermeable to water, after which the dough is worked up into dry pastry in a suitable manner.

According to a specific embodiment of the invention, 10 to 45% by weight of dry edible protein is added to the dough. These percentages are calculated with respect to the proportion of dry substances in the dough.

It should be mentioned that the layer which is substantially impermeable to water should substantially pass none of the water contained in the dough, but must be soluble in, or adapted to be attacked by, the gastric juices in the digestive tract.

The layers which are impermeable to water can comprise fatty substances, for example the solid higher hydrocarbons and also fats or waxes.

According to a preferred embodiment of the invention, the layer which is substantially impermeable to water consists of an edible animal or vegetable fat, such as, for example, palm-kernel fat, coconut fat, arachis oil, colza oil, cottonseed oil, lard or hardened train oil.

Preferably, the fats should be plastic and have a melting point range between 20 and 45° C.

The amount of fatty substances is not bounded by narrow limits. Preferably the dough contains from 10% to 20% by weight of added fat, calculated with respect to the proportion of dry substances in the dough.

The dry edible protein to be added to the dough can be surrounded by a layer which is substantially impermeable to water by mixing the protein, which may be powdered or granular, with a solution, emulsion, dispersion or melt of the substance forming the substantially impermeable layer and by subsequently evaporating the solvent or, if no solvent is used, by cooling the mixture of protein and melt. Preferably the dry edible protein is mixed with a fat having a desired plastic consistency. If required, flour may be added to the dry edible protein. This procedure may be repeated, if in the preceding process the layer surrounding the protein particles has any openings in it.

The weight ratio between the water, edible protein, flour and fat in the dough is not restricted within narrow limits. According to the method of the invention, satisfactory results have been obtained by using a dough in which the amount of dry edible protein, calculated with respect to the amount of dry substances in the dough, varies between 10% and 45% by weight, the flour content ranging between 30% and 50% by weight. Suitable kinds of flour are those produced from wheat, rye, maize, rice and mixtures thereof, and also starch.

In regard to the proteins, casein particularly, for example rennet casein and/or acid casein, produced favourable results. In addition, we may mention as suitable proteins those produced from grain (for example gluten), from peas, beans, lentils, such as soya beans and arachis and proteins from tubers (potatoes) and furthermore animal proteins, such as, for example meat and/or fish albumins and lactalbumens.

In order to enhance the value of the dry pastry, the dough may have added to it one or more vitamins, for example, vitamin A, the vitamins of the B complex, vitamin C or D and also sugars, such as saccharose, glucose and, if required, flavouring materials. It appeared that the stablity of the vitamins is fairly good and in some cases higher than might be expected from baking experiments with other doughs to which the invention has not been applied.

The invention will now be described in detail with reference to the following examples.

5 different kinds of dough were made, the composition of which is given in the following tables. From the first three doughs, biscuits were made, from the latter two, crackers.

| Sample | I | II | III | IV | V |
|---|---|---|---|---|---|
| flour | 100 | 100 | 100 | 100 | 100 |
| sugar | 40 | 40 | 40 | | |
| soft baking fat | 35 | 35 | 30 | 35 | 35 |
| rennet casein | 75 | 100 | 20 | 75 | 100 |
| water | 22.5 | 22.5 | 22.5 | 70 | 40 |
| skim-milk powder | | | | 4 | |
| sodium bicarbonate | 1.7 | 1.7 | 1.7 | 1 | 1.7 |
| cream of tartar | 4.5 | 4.5 | 4.5 | | |
| yeast | | | | 4 | 4 |
| glucose syrup | | | | 2 | 4 |
| salt | 0.8 | 0.8 | 0.9 | 1 | 0.8 |

For the production of the biscuits, the sieved dry mixture of flour, sugar, cream of tartar and salt were mixed in the kneading machine. To this dry mixture a solution of sodium bicarbonate in water was added and the aggregate was then kneaded to form a dough. Subsequently, to this dough a mixture of the soft fat whipped to a creamy consistence and the ground rennet casein was added and the mixture was kneaded to produce a suitable dough. The dough was rolled after which biscuits were cut from it, which were baked in an oven at 250° C.

For the production of the crackers, a stiff dough was kneaded from the flour, the skim-milk powder, the clear syrup, the yeast and part of the water. This dough was allowed to rise for about one hour, after which a solution of sodium carbonate in the remainder of the water and a mixture of the creamy whipped soft fat and the ground rennet casein were kneaded into the dough. Subsequently, the dough was finished by rolling and cutting slices from it. The slices were baked in an oven at a temperature of 225° C.

The biscuits and crackers thus produced had a normal browned appearance and tasted nice.

I claim:

1. A method of preparing a baking dough containing flour, water, a leavening agent, an edible fat and an edible dry protein in an amount of from 10% to 45% by weight based on the dry substances in the dough, comprising the steps of mixing the protein and fat to form a composition in which the individual particles of the protein are each completely enclosed by a water impermeable layer of the fat and mixing said composition with the remaining ingredients of the dough.

2. A method of preparing a baking dough containing flour, water, a leavening agent, an edible fat in an amount of from 10% to 20% by weight based on the dry substances in the dough, and an edible dry protein in an amount of from 10% to 45% by weight based on the dry substances in the dough, comprising the steps of mixing the protein and fat to form a composition in which the individual particles of the protein are each completely enclosed by a water impermeable layer of the fat and mixing said composition with the remaining ingredients of the dough.

3. The method of claim 1 in which the fat has a plastic consistency and a melting point range between 20° C. and 45° C.

4. The method of claim 1 in which the fat is selected from the group consisting of palm kernel oil, coconut oil, arachis oil, colza oil, cottonseed oil, lard and hardened train oil.

5. The method of claim 1 in which the edible dry protein is selected from the group consisting of rennet casein and acid casein and mixtures thereof.

6. A baked pastry product prepared from a dough the dry ingredients of which comprise flour, a leavening agent and an edible dry protein in an amount of from 10% to 45% by weight, the individual particles of which are completely enclosed by a water impermeable layer of an edible fat.

7. A baked pastry product prepared from a dough the dry ingredients of which comprise flour, a leavening agent and an edible dry protein in an amount of from 10% to 45% by weight, the individual particles of which are completely enclosed by a water impermeable layer of an edible fat in an amount of from 10% to 20% by weight.

8. A baked pastry product prepared from a dough the dry ingredients of which comprise flour, a leavening agent and an edible dry protein in an amount of from 10% to 45% by weight, the individual particles of which are completely enclosed by a water impermeable layer of an edible fat having a plastic consistency, a melting point range between 20° C. and 45° C. and in an amount between 10% to 20% by weight.

9. A baked pastry product prepared from a dough the dry ingredients of which comprise flour, a leavening agent and an edible dry protein in an amount of from 10% to 45% by weight, the individual particles of which are completely enclosed by a water impermeable layer of an edible fat in an amount of from 10% to 20% by weight and selected from the group consisting of palm kernel oil, cocoanut oil, arachis oil, colza oil, cottonseed oil, lard and hardened train oil.

10. A baked pastry product prepared from a dough the dry ingredients of which comprise flour, a leavening agent and an edible dry protein in an amount of from 10% to 45% by weight, and selected from the group consisting of rennet casein, acid casein and mixtures thereof, the individual particles of which are completely enclosed by a water impermeable layer of an edible fat in an amount of from 10% to 20% by weight.

References Cited in the file of this patent

UNITED STATES PATENTS

| | | |
|---|---|---|
| 1,160,783 | Sulzberger | Nov. 16, 1915 |
| 2,086,184 | Haas | July 6, 1937 |
| 2,145,016 | Spalding | Jan. 24, 1939 |
| 2,225,894 | White | Dec. 24, 1940 |
| 2,685,517 | Dunmire | Aug. 3, 1954 |
| 2,738,277 | Cryns | Mar. 13, 1956 |

FOREIGN PATENTS

| | | |
|---|---|---|
| 3,161 | Great Britain | Mar. 1, 1888 |